(12) United States Patent
Broyde et al.

(10) Patent No.: US 8,849,956 B2
(45) Date of Patent: Sep. 30, 2014

(54) VIDEO PROCESSING FEEDBACK

(75) Inventors: Dmitry Broyde, Mountain View, CA (US); Slave Jovanovski, San Bruno, CA (US); Vijnan Shastri, Mountain View, CA (US); Stanley Wang, San Bruno, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 13/006,811

(22) Filed: Jan. 14, 2011

(65) Prior Publication Data

US 2012/0185568 A1    Jul. 19, 2012

(51) Int. Cl.
G06F 15/173    (2006.01)
H04N 21/2343    (2011.01)
H04N 21/2743    (2011.01)
H04N 21/431    (2011.01)

(52) U.S. Cl.
CPC ..... *H04N 21/23439* (2013.01); *H04N 21/2743* (2013.01); *H04N 21/4312* (2013.01)
USPC ........................................................ 709/219

(58) Field of Classification Search
None
See application file for complete search history.

(56) References Cited

U.S. PATENT DOCUMENTS

| 2002/0140852 A1 | 10/2002 | Miller et al. | |
|---|---|---|---|
| 2006/0259589 A1* | 11/2006 | Lerman et al. | 709/219 |
| 2007/0174774 A1 | 7/2007 | Lerman et al. | |
| 2010/0104146 A1 | 4/2010 | Momosaki | |

FOREIGN PATENT DOCUMENTS

| JP | 2004040502 A | 2/2004 |
|---|---|---|
| KR | 10-2009-0106453 A | 10/2009 |
| KR | 10-2010-0134610 A | 12/2010 |
| WO | WO 2007/126295 A1 | 11/2007 |

OTHER PUBLICATIONS

PCT International Search Report and Written Opinion, PCT/US2011/061179, May 4, 2012, 7 pages.
Novelty Search Report received from the Dutch Patent Office and researched by the European Patent Office, Dutch patent application No. NL 2007902, Feb. 15, 2012, 12 pages.
Broyde, D., et al., "New Thumbnail "Flipbook" in Upload Shows Video Processing Progress," YouTube, Jan. 27, 2010, 2 pages, [online] [retrieved on Feb. 15, 2012] Retrieved from the internet <URL:URL:http://youtube-global.blogspot.com/2010/01/new-thumbnail-flipbook-in-upload-shows.html>.

* cited by examiner

*Primary Examiner* — Scott Christensen
(74) *Attorney, Agent, or Firm* — Fenwick & West LLP

(57) ABSTRACT

A system for providing video processing feedback to content providers uploading a video file. As the content provider uploads a video file to the video processing server, the server processes the uploading file and extracts representative video frames from the video file. The video processing server embeds the representative frames into a processing feedback page hosted on a web server in the video processing server. Each representative frame in the feedback page represents a part of the uploading video. The feedback page is accessible through the content provider's browser and the feedback page includes a sequence of representative frames in temporal order. In one embodiment, the representative frames in the feedback page are colored or shaded to indicate whether the video part represented by a particular frame has been processed.

29 Claims, 5 Drawing Sheets

VIDEO PROCESSING FEEDBACK

BACKGROUND

1. Field of Invention

The embodiments of the invention generally relates to the field of processing online content, in particular to providing video processing feedback.

2. Description of the Related Art

Most online users are familiar with online video-hosting services where individuals and content publishers can upload videos for viewing by others. Typically, these services provide online tools for a user to upload videos. The user selects a video from a local storage, and initiates the upload process. The vide-hosting service then determines the format of the received audio and video in the received content and decodes the received content. Because the video-hosting service receives content in numerous formats, determining the format of the video and audio in the received content, and decoding the received content using the correct decoder is an essential part of the video-hosting service. The user is typically given very little information about the status of this video processing, and the user at best is presented with a generic "progress bar" that shows uploading of the video as an arbitrary percentage of the video that has been processed. For example, a progress bar showing that 78% of the video has been uploaded does not provide the user with adequate information as to the progress of processing the video and whether the video was decoded successfully or not.

Moreover, the generic progress bar can be misleading at times because the user and the service have different definitions of progress. For example, the service may process the uploaded video into an undesired format such that the quality of the processed video is unacceptable. Accordingly, the user may see the progress bar indicating that the uploaded video has been successfully processed when the processed video undesirably comprises blocky or black frames. In such cases, the user is misled into believing that the video has been successfully uploaded and processed.

SUMMARY

A video processing server provides feedback to content providers uploading a video file which includes displaying a sequence of frames that have been processed. As the content provider uploads a video file to the video processing server, the server processes the uploading file and extracts representative video frames from the video file. The video processing server places the representative frames into a processing feedback page hosted on a web server in the video processing server. Each representative frame in the feedback page represents a part of the uploading video. The feedback page is accessible through the content provider's browser and the feedback page includes the sequence of representative frames in temporal order. In one embodiment, the representative frames in the feedback page are colored or shaded to indicate whether the video part represented by a particular frame has been processed.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein provides video processing feedback to a user. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
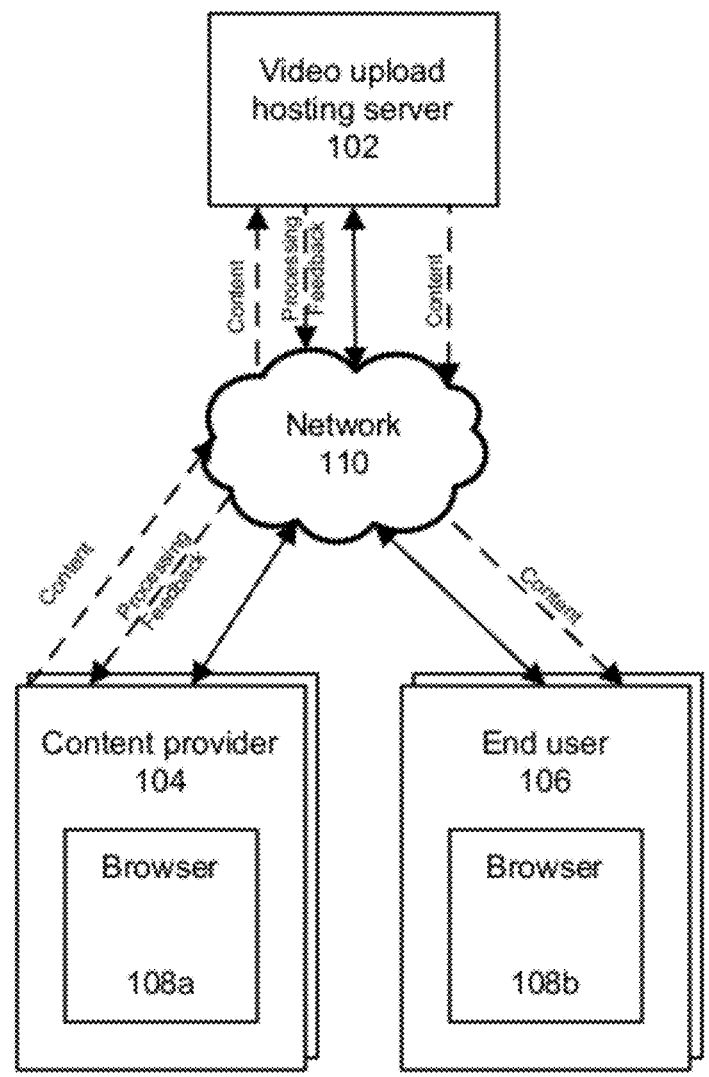
FIG. 1 is a block diagram illustrating a computing environment for providing video processing feedback according to one embodiment.

Referring to FIG. 1, a computing environment 100 for providing video processing feedback comprises a content provider client 104, an end user client 106, a video upload hosting server 102 and a network 110. One of ordinary skill in the art will understand that additional video upload hosting servers 102 may also be present in the computing environment 100 and the figure depicts only one server 102 for illustration purposes. Similarly, additional clients 104-106 may also be present in the computing environment 100. The browser can, for example, view a web page that contains a video to be watched or a web page that has an embedded video, where the video is downloaded from the video upload hosting server 102.

The end user client 104 and the content provider client 106 are computing devices with a processor and a memory capable of running applications like browser 108. Examples of clients 104-106 include a desktop, a laptop and a handheld computing device. The browser 108 is an application that runs on clients 104-106, and the browser 108 retrieves and presents online data available on various entities like the video upload hosting server 102.

The video upload hosting server 102 stores and processes video files for later transmission to an end user client 106. The video upload hosting server 102 receives video files from content providers through their client 104, processes the received file into an appropriate format and stores the processed file. In one embodiment, the video upload hosting server 102 later transmits the stored file for display to the content provider's client 104 as part of the feedback for video processing. The video upload hosting server 102 is further described in context of FIG. 2.

The network 110 represents the communication pathways between the content provider client 104, the end user client 106, and the video upload hosting server 102. In one embodiment, the network 110 is the Internet. The network 110 can also use dedicated or private communications links that are not necessarily part of the Internet.

Overview

A content provider launches a browser 108*a* on client 104 and accesses an upload web page on the video upload hosting server 102 to upload a video file. As the video file is being uploaded, the video upload hosting server 102 processes the video and provides feedback regarding the processing including a sequence of representative frames that have been processed. The feedback is available on the same web page used to upload the video or another web page linked or directed from the upload web page.

Figure 5:
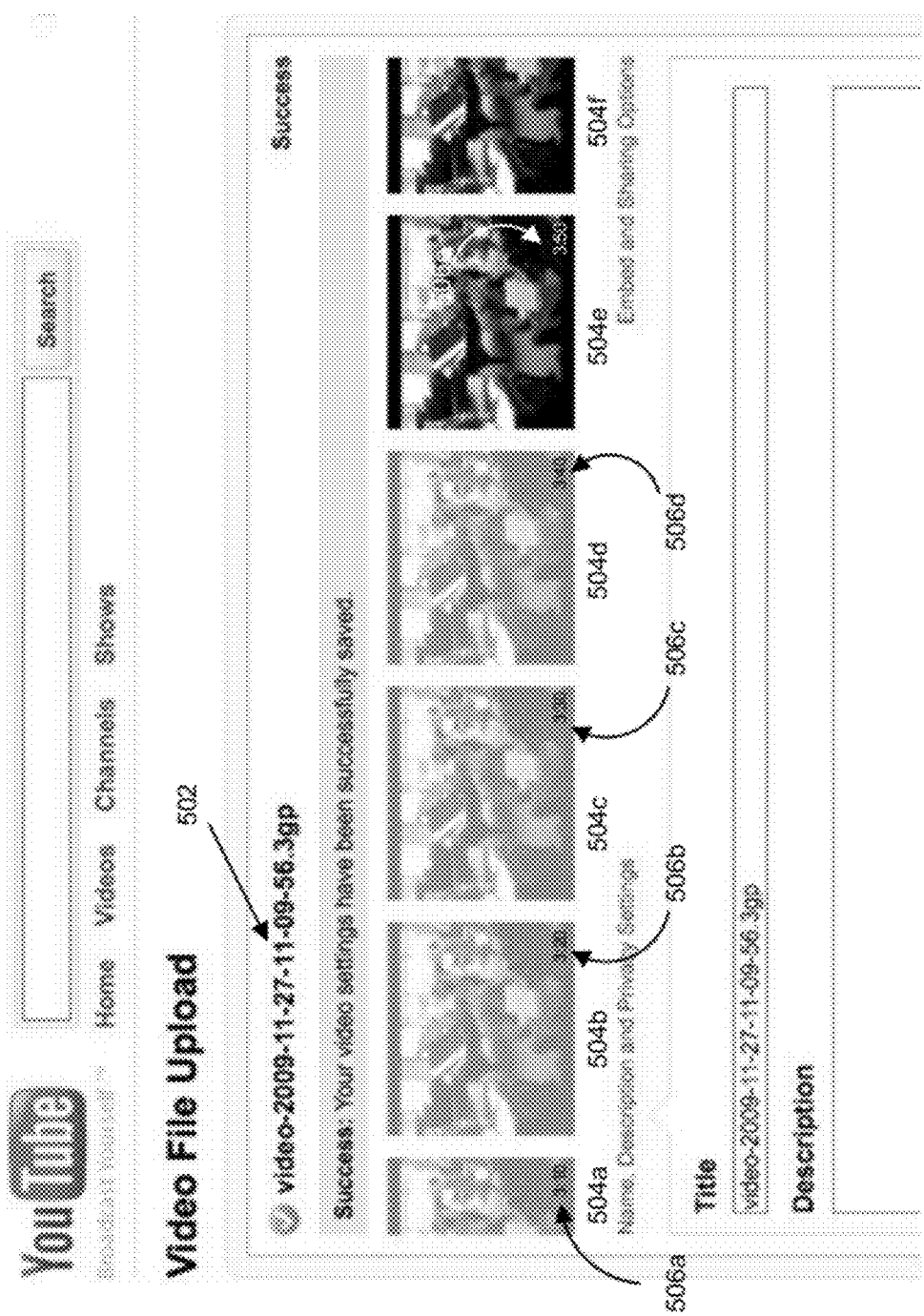
FIG. 5 is a screenshot illustrating a web page that provides video processing feedback according to one embodiment.

FIG. 5 illustrates an example of a web page providing such video processing feedback. The web page displays the title 502 of the video and provides the video processing feedback. The feedback beneficially includes sequential frames 504*a-f* from the video representing various parts of the video that have been processed by the server 102. Additionally, in one embodiment, the sequential frames 504*a-e* also include a temporal indicator 506*a-e* identifying the temporal position (e.g. time code) of the frame in the video. Moreover, in one embodiment, the feedback also includes the frames that have already been processed and the frames that will be processed in the near future. As illustrated in FIG. 5, such feedback is provided by displaying the processed video frames 504*a-d* in a shade or a color that is different from the shade or color of the unprocessed video frames 504*e-f*. The sequence of frames 504 is updated as the server 102 processes additional frames, and the frames are progressively shifted from right to left, thus providing a dynamic indication of the specific portions of the video that have been and remain to be processed.

The content provider can now look at the provided feedback and determine the parts of the video that have been processed. Unlike a plain progress bar displaying the percentage of the processed video, the sequential frames provide the content provider with useful information about the frames of the video that have been processed, along with a visual indication of how fast they are being processed, indicated by the rate at which new representative frames are displayed and moved across the screen. The content provider therefore does not have to guess or calibrate the displayed percentage in a plain progress bar to determine the processed part of the video.

After the video file is uploaded and processed, the video file is available for transmission. An end user later accesses through browser 108*b* on end user client 106 a display web page where the processed videos are available for viewing.

As described, particular functions are described as being performed by various entities, particularly the video processing server and client. This description and the function assignment are for illustration purposes and do not limit entities like the server or the client to their assigned functions. One of ordinary skill in the art will understand that functions described in one embodiment as being performed on the server side can also be performed on the client side in other embodiments if appropriate. Similarly, the client side functions can be performed by the server if appropriate. Additionally, the functionality attributed to a particular component can be performed by different or multiple components operating together, as deemed appropriate by the implementer.

Video Upload Hosting Server

Figure 2:
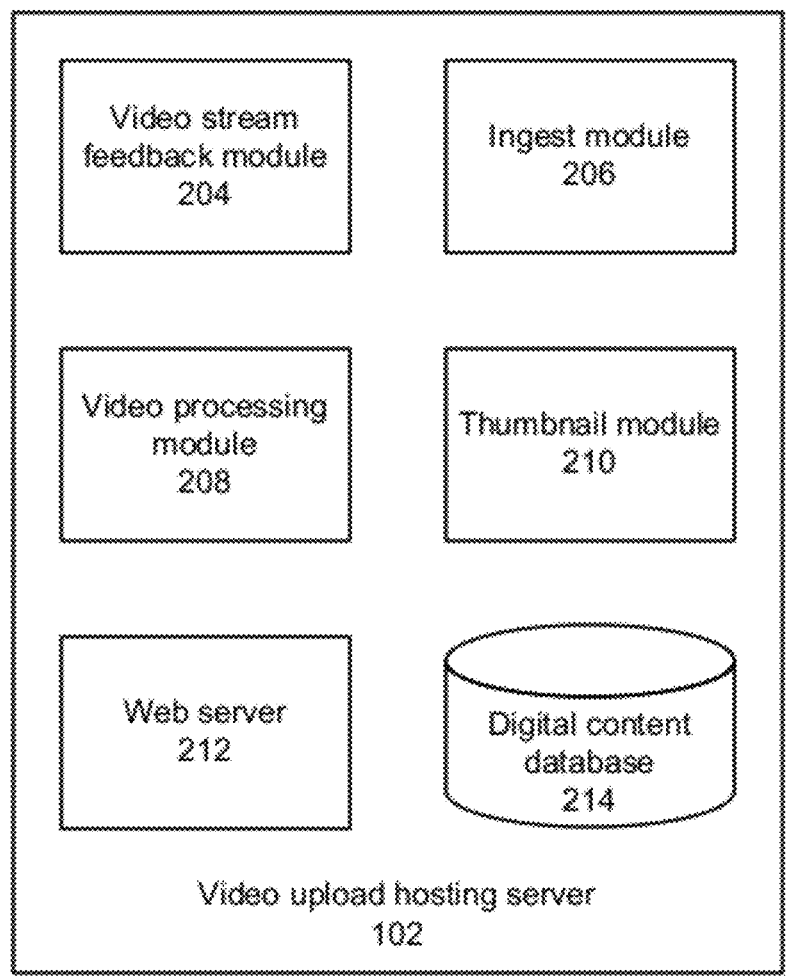
FIG. 2 is a block diagram illustrating a video upload hosting service according to one embodiment.

FIG. 2 is a block diagram illustrating the video upload hosting server 102 according to one embodiment. The video upload hosting server 102 comprises a video stream feedback module 204, an ingest module 206, a video processing module 208, a thumbnail module 210, a web server 212 and a digital content database 214.

The video stream feedback module 204 receives and responds to requests for processed video content. The video stream feedback module 204 includes logic for searching the digital content database 214 in response to receiving a request for processing feedback. In one embodiment, the video stream feedback module 204 receives as part of a request for processing feedback, an index corresponding to a particular part of the processed or being processed video file (e.g., a time code). The video stream feedback module 204 transmits the corresponding part of the video file in response to receiving the index and the video file is played as part of the processing feedback.

The ingest module 206 receives the video being uploaded from the content provider client 106 and the video processing module 208 processes the uploading video for storage in the digital content database 214. This processing can include format conversion (transcoding), scaling, compression, metadata tagging, content analysis, fingerprinting, and other data processing. Additionally, the video processing module 208 retrieves representative frames from the received video and transmits the representative frames to the thumbnail module 210.

Figure 3:
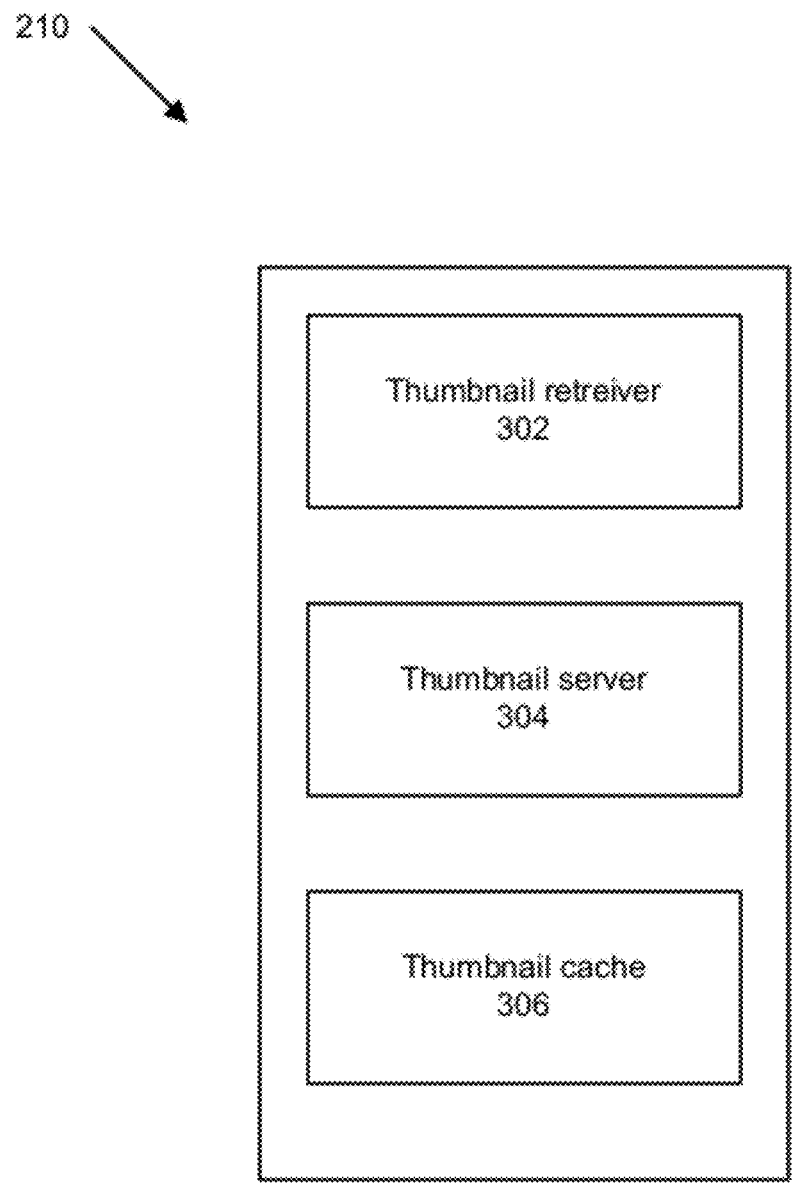
FIG. 3 is a block diagram illustrating a thumbnail module according to one embodiment.

The thumbnail module 210 stores a sequence of frames representative of processed and unprocessed video parts and transmits the stored frames for display on the web page providing the video processing feedback. Referring to FIG. 3, the thumbnail module 210 comprises a thumbnail retriever 302, a thumbnail server 304 and a thumbnail cache 306.

The thumbnail retriever 302 receives a sequence of representative frames from the video processing module 208 and stores the received frames in the thumbnail cache 306. Each received representative frame is associated with a portion of the video received and eventually processed by the video processing module 208. The associated video portion is part of the video in vicinity of the scene depicted by the representative frame. For example, a representative frame depicting a scene at the fifth second of the video can represent the first five seconds of the video. Similarly, a representative frame depicting a scene at the eleventh second of the video can represent the video from the eleventh second to the thirteenth second. An example of the representative frames is an I-frame or an intra-coded frame in a video file.

In one embodiment, the thumbnail retriever 302 also receives and stores a temporal indicator representing a position of the received frame in the video file. Additionally, in one embodiment, the thumbnail retriever 302 converts the received frame into a desirable image format like JPEG and stores the converted frame in the thumbnail cache 306. In another embodiment, the thumbnail retriever 302 stores the received frame into thumbnail cache 306 without converting the frame to another format. As the video processing module 208 progresses in processing the video file, the thumbnail retriever 302 repeatedly receives additional frames and/or update messages including progress information about the processing progress from the video processing module 208. The progress information includes an identification of the one or more processed frames indicating that the identified frames have been processed. In one embodiment, the thumbnail retriever 302 repeatedly polls the video processing module 208 for the newly available frames and the progress information instead of receiving the frames and the progress information from the video processing module 208. Regardless of how the thumbnail retriever 302 receives the frames and the progress information, the thumbnail retriever 302 stores the frames and the progress information in the thumbnail cache 306.

In one embodiment, the thumbnail retriever 302 also receives additional information from the video processing module 208 corresponding to a representative frame. For example, the thumbnail retriever 302 receives a bit rate or a format associated with the frame. The bit rate is the bit rate of the processed video content represented by the frame. Similarly, the format is the format of the processed video content represented by the frame. Additionally, the thumbnail retriever 302 receives an index to the processed video content represented by the frame in the video file. Additionally, the thumbnail retriever 302 may also receive (or calculate) the amount of time taken to process the video content represented by the frame. Additionally, in one embodiment, if the frame represents a part of the video file that is yet to be processed, the thumbnail retriever 302 receives from the video processing module 208 (or calculates) the estimated time required to process the represented video content. The thumbnail retriever 302 receives one or more of the above mentioned pieces of additional information and stores the received information in the thumbnail cache 306.

The thumbnail cache 306 stores the received frames from the thumbnail retriever 302 and later retrieves the stored frames responsive to receiving a request from the thumbnail server 304. Additionally, in one embodiment, the thumbnail cache 306 also stores the temporal information and progress information corresponding to the stored frames. Alternatively, the thumbnail cache 306 receives from the thumbnail retriever 302 the additional information mentioned above and the thumbnail cache 306 also stores this received information.

The thumbnail server 304 receives and serves a request for the representative frames either from the content provider client 104 or an intermediary entity providing the feedback to the content provider client 104. In one embodiment, the thumbnail server 304 receives a request with an identification for a video and the server 304 retrieves from the thumbnail cache 306 the representative frames for the requested video. In one embodiment, the thumbnail server 304 retrieves frames that represent video scenes at approximately equal intervals in the video. For example, the thumbnail server 304 can retrieve every Nth frame (e.g., every $15^{th}$ frame), or a frame every M seconds. In another embodiment, the thumbnail server 304 retrieves all the frames or every other frame stored for the requested video. Alternatively, the thumbnail server 304 also retrieves additional information, like time code information, corresponding to the frames and stored in the thumbnail cache 306. The thumbnail server 304 then transmits the retrieved frames and optionally the additional information for display on the browser 108a installed on the content provider client 104. The frames are preferably transmitted in a sequential order corresponding to their times. In case the thumbnail server 304 does not transmit the retrieved frames in a sequential order, an intermediary entity like the web server 212 reorders the frames in a sequential order. Such reordering beneficially ensures that the frames are displayed on browser 108a in the same order in which the video processing module 208 processes the video parts corresponding to the frames.

Referring back to FIG. 2, the web server 212 is responsible for communication between the video upload hosting server 102 and clients 104-106. The web server 212 receives requests for web objects including web pages, videos and related information, and provides videos and other requested objects in return. Additionally, the web server 212 populates a web page with links to objects providing video processing feedback and transmits the populated web page upon receiving a request for the page. For example, the web server 212 embeds links for representative frames representing a video being processed. Additionally, the web server 212 embeds in the web page links for additional information associated with the representative frames. Alternatively, the web server 212 embeds in the web page the additional information itself instead of a link to the information.

The digital content database 214 stores the videos processed by the video upload hosting server 102. In addition to the video content, the digital content database 214 stores metadata associated with the video content. The metadata is provided by the content provider, the operator of video upload hosting server 102, or the third parties. Examples of metadata include a video ID, artist, video title, label, genre, time length, and optionally georestrictions that can be used for data collection or content blocking on a geographic basis. The video content is retrieved from the digital content database 214 by the video stream feedback module 204 to provide feedback for video processing to the content provider.

Video Processing Feedback Methodology

Figure 4:
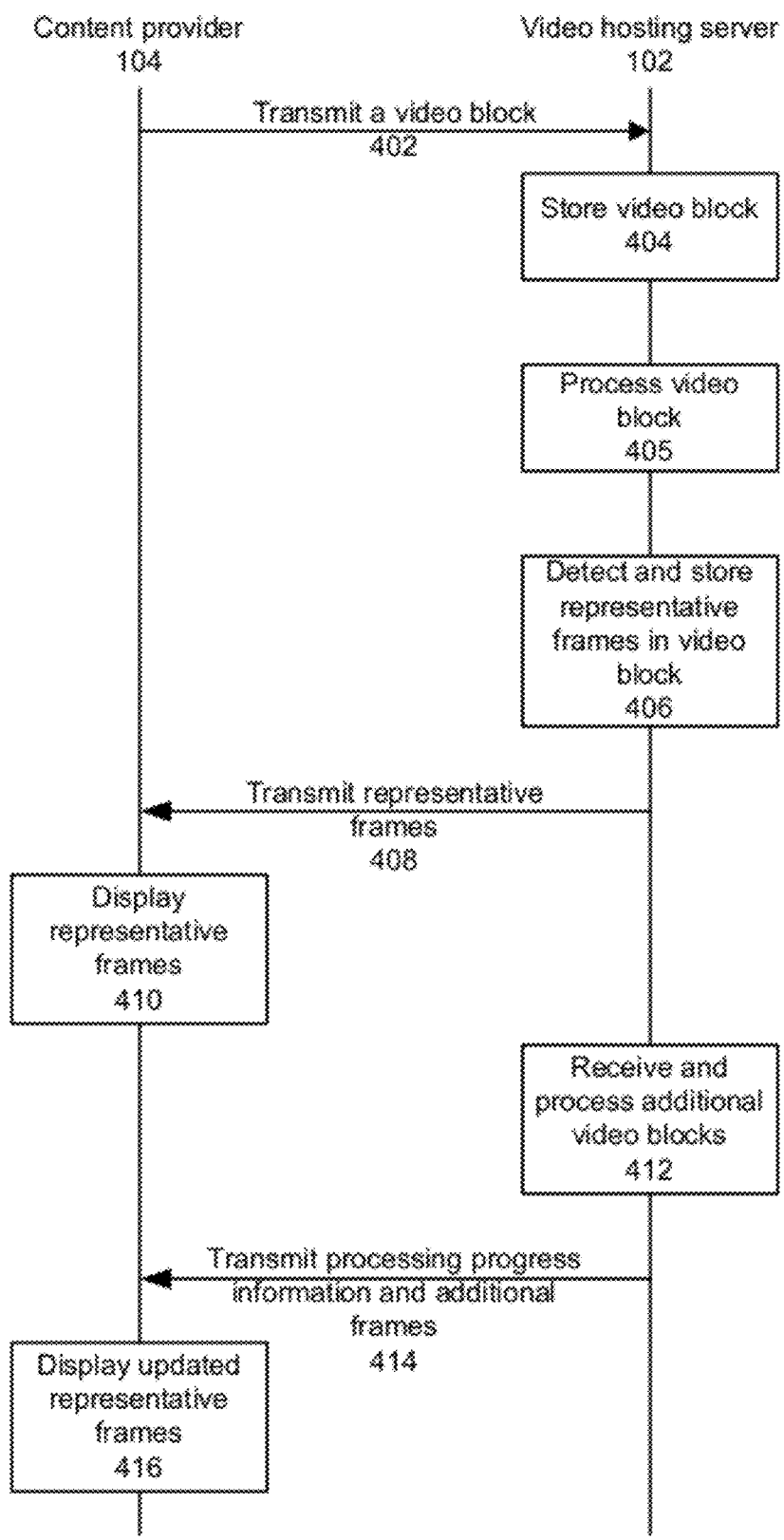
FIG. 4 is a trace diagram illustrating a method for providing video processing feedback according to one embodiment.

FIG. 4 is a trace diagram illustrating a method for providing video processing feedback. The content provider accesses a web page through the browser 108a on content provider client 104 and the content provider selects a video file to be uploaded to the video upload hosting server 102. Consequently, the content provider client 104 starts transmitting the video. After the content provider 104 transmits 402 a video block, the video upload hosting server 102 stores 404 the received video block, starts processing 405 the received video block, detects the representative frames in the video block and stores 406 the representative frames.

Later, as part of the feedback, the video upload hosting server 102 transmits 408 one or more of the stored representative frames to the content provider client 104. In one embodiment, the video upload hosting server 102 also transmits the progress information corresponding to the transmitted frames. The progress information indicates the transmitted frames that have been processed and/or the transmitted frames that have yet to be processed. The content provider client 104 receives the transmitted frames and optionally the transmitted progress information. Based on the received information, the content provider client 104 provides video processing feedback by displaying 410 a web page with one or more of the received frames. An example of such a web page is illustrated in FIG. 5 described above.

In the meantime, the video upload hosting server 102 keeps processing 412 additional unprocessed video parts. As the video upload hosting server 102 processes more video parts, the video upload hosting server 102 transmits 414 additional representative frames, progress information about the additional representative frames, and/or progress information about the previously transmitted representative frames. Based on the transmitted information, the content provider client 104 displays a web page with updated representative frames.

For example, while processing a video, the video upload hosting server 102 transmits first six representative frames to the content provider client 104 at step 408. Additionally, the video processing server 102 transmits progress information indicating that the first four of the six transmitted frames have been processed. Consequently, the content provider client 104 displays the web page with the first four processed frames in one shade and the next two unprocessed frames in another shade. Later, the video upload hosting server 102 processes the remaining two frames of the previously six transmitted frames and the server 102 transmits a processing update message indicating the processing of the two frames. The content provider client 104 receives the update message and displays the updated web page displaying all six processed frames. In one embodiment, the update messages are not directly received by the content provider client 104. Instead the update messages are received by the thumbnail module 210 from the video processing module 208 within the video upload hosting server 102. Responsive to receiving the update message, the thumbnail module 210 updates the shades or color of the stored frames. The updated frames are then embedded in a web page and a link to the updated embedded frames is sent by the web server 212 to the browser 108*a* on the content provider client 104. The browser 108*a* then retrieves the updated frames and displays the updated frame embedded in the web page.

After the frames are displayed on the web page, a user can select one of the displayed frames to get additional information. In response to receiving the user's selection of a particular frame, the browser 108 retrieves from the video upload hosting server 102 and displays information like the bit rate or format associated with the part of the video represented by the selected frame. Alternatively, the browser displays the time taken to process the represented video part or the estimated time required to process the represented video part (if the represented video part has not been processed yet). Additionally, in one embodiment, the browser retrieves temporal information associated with the frames and displays the temporal information with the frames. Moreover, in another embodiment, upon receiving the user's selection, the browser 108 plays the video part associated with the selected frame.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for providing feedback regarding processing of video content, the method comprising:
   transmitting to a video upload hosting server a stream of video content;
   receiving, from the video upload hosting server, a sequence of representative frames extracted from the video content by the video upload hosting server, the received representative frames comprising processed frames and unprocessed frames, the processed frames representing a portion of the video content processed by the video upload hosting server and the unprocessed frames representing a portion of the video content not processed by the video upload hosting server; and
   displaying the sequence of the received representative frames simultaneously in a temporal order, the simultaneously displayed sequence of representative frames visually indicating a progress of the video upload hosting server in processing the stream of video content.

2. The computer-implemented method of claim 1, wherein the representative frames are displayed while the video upload hosting server processes the stream of video content and the displayed sequence of received representative frames dynamically indicates a portion of the video content currently being processed by the video upload hosting server.

3. The computer-implemented method of claim 1, wherein the received representative frames are displayed after the video content is completely transmitted to the video upload hosting server.

4. The computer-implemented method of claim 1, wherein visually indicating the progress of the video upload hosting server in processing the stream of video content comprises displaying the processed frames using a first color and displaying the unprocessed frames using a second color visually distinguished from the first color.

5. The computer-implemented method of claim 1, further comprising:
   displaying a format or a bit rate of a processed video content represented by a displayed representative frame.

6. The computer-implemented method of claim 1, further comprising:
   displaying a temporal value with a displayed representative frame, the temporal value representing a position of the displayed representative frame in the processed video content, wherein video content represented by the displayed representative frame is played until the temporal value responsive to selection of the displayed representative frame.

7. The computer-implemented method of claim 1, wherein an unprocessed frame represents an unprocessed part of the video content and further comprising:
displaying an estimated time required for processing the unprocessed part of the video content represented by the unprocessed frame responsive to selection of the unprocessed frame.

8. The computer-implemented method of claim 1, wherein a processed frame represents a processed part of the video content and further comprising:
displaying a processing time taken for processing the processed part of the video content represented by the processed frame responsive to selection of the processed frame.

9. A computer program product for providing feedback regarding processing of video content, the computer program product comprising a non-transitory computer-readable storage medium including computer program code for:
transmitting to a video upload hosting server a stream of video content;
receiving, from the video upload hosting server, a sequence of representative frames extracted from the video content by the video upload hosting server, the received representative frames comprising processed frames and unprocessed frames, the processed frames representing a portion of the video content processed by the video upload hosting server and the unprocessed frames representing a portion of the video content not processed by the video upload hosting server; and
displaying the sequence of the received representative frames simultaneously in a temporal order, the simultaneously displayed sequence of representative frames visually indicating a progress of the video upload hosting server in processing the stream of video content.

10. The computer program product of claim 9, wherein the representative frames are displayed while the video upload hosting server processes the stream of video content and the displayed sequence of received representative frames dynamically indicates a portion of the video content currently being processed by the video upload hosting server.

11. The computer program product of claim 9, wherein visually indicating the progress of the video upload hosting server in processing the stream of video content comprises displaying the processed frames using a first color and displaying the unprocessed frames using a second color visually distinguished from the first color.

12. The computer program product of claim 9, further comprising computer program code for:
displaying a format or a bit rate of a processed video content represented by a displayed representative frame.

13. The computer program product of claim 9, further comprising computer program code for:
displaying a temporal value with a displayed representative frame, the temporal value representing a position of the displayed representative frame in the processed video content, wherein video content represented by the displayed representative frame is played until the temporal value responsive to selection of the displayed representative frame.

14. The computer program product of claim 9, wherein an unprocessed frame represents an unprocessed part of the video content and further comprising computer program code for:
displaying an estimated time required for processing the unprocessed part of the video content represented by the unprocessed frame responsive to selection of the unprocessed frame.

15. The computer program product of claim 9, wherein a processed frame represents a processed part of the video content and further comprising computer program code for:
Displaying a processing time taken for processing the processed part of the video content represented by the processed frame responsive to selection of the processed frame.

16. A computer-implemented method for providing feedback regarding processing of video content, the method comprising:
receiving, from a content provider client, at a video upload hosting server a stream of video content;
transmitting from the video upload hosting server, a sequence of representative frames extracted from the video content by the video upload hosting server, the transmitted representative frames comprising processed frames and unprocessed frames, the processed frames representing a portion of the video content processed by the video upload hosting server and the unprocessed frames representing a portion of the video content not processed by the video upload hosting server; and wherein
the transmitted sequence of representative frames are displayed simultaneously on the content provider client in a temporal order, the simultaneously displayed sequence of representative frames visually indicating a progress of the video upload hosting server in processing the stream of video content.

17. The computer-implemented method of claim 16, wherein the representative frames are displayed while the video upload hosting server processes the stream of video content and the transmitted sequence of representative frames dynamically indicates a portion of the video content currently being processed by the video upload hosting server.

18. The computer-implemented method of claim 16, wherein visually indicating the progress of the video upload hosting server in processing the stream of video content comprises displaying the processed frames using a first color and displaying the unprocessed frames using a second color visually distinguished from the first color.

19. The computer-implemented method of claim 16, further comprising:
transmitting for display a format or a bit rate associated with processed video content represented by a displayed representative frame.

20. The computer-implemented method of claim 16, further comprising:
transmitting for display a temporal value with a displayed representative frame, the temporal value representing a position of the displayed representative frame in the processed video content, wherein video content represented by the displayed representative frame is played until the temporal value responsive to selection of the displayed representative frame.

21. The computer-implemented method of claim 16, further comprising:
receiving a user selection indicating a selected unprocessed frame representing an unprocessed part of the video content; and
transmitting for display an estimated time required for processing the unprocessed part of the video content represented by the selected unprocessed frame.

22. The computer-implemented method of claim 16, further comprising:
   receiving a user selection indicating a selected processed frame representing a processed part of the video content; and
   transmitting for display a processing time taken for processing the processed part of the video content represented by the selected processed frame.

23. A computer program product for providing feedback regarding processing of video content, the computer program product comprising a non-transitory computer-readable storage medium containing computer program code for:
   receiving, from a content provider client, at a video upload hosting server a stream of video content;
   transmitting from the video upload hosting server, a sequence of representative frames extracted from the video content by the video upload hosting server, the transmitted representative frames comprising processed frames and unprocessed frames, the processed frames representing a portion of the video content processed by the video upload hosting server and the unprocessed frames representing a portion of the video content not processed by the video upload hosting server; and wherein
   the transmitted sequence of representative frames are displayed simultaneously on the content provider client in a temporal order, the simultaneously displayed sequence of representative frames visually indicating a progress of the video upload hosting server in processing the stream of video content.

24. The computer program product of claim 23, wherein the representative frames are displayed while the video upload hosting server processes the stream of video content and the transmitted sequence of representative frames dynamically indicates a portion of the video content currently being processed by the video upload hosting server.

25. The computer program product of claim 23, wherein visually indicating the progress of the video upload hosting server in processing the stream of video content comprises displaying the processed frames using a first color and displaying the unprocessed frames using a second color visually distinguished from the first color.

26. The computer program product of claim 23, further comprising computer program code for:
   transmitting for display a format or a bit rate associated with processed video content represented by a displayed representative frame.

27. The computer program product of claim 23, further comprising computer program code for:
   transmitting for display a temporal value with a displayed representative frame, the temporal value representing a position of the displayed representative frame in the processed video content, wherein video content represented by the displayed representative frame is played until the temporal value responsive to selection of the displayed representative frame.

28. The computer program product of claim 23, further comprising computer program code for:
   receiving a user selection indicating a selected unprocessed frame representing an unprocessed part of video content; and
   transmitting for display an estimated time required for processing the unprocessed part of the video content represented by the selected unprocessed frame.

29. The computer program product of claim 23, further comprising computer program code for:
   receiving a user selection indicating a selected processed frame representing a processed part of video content; and
   transmitting for display a processing time taken for processing the processed part of the video content represented by the selected processed frame.

* * * * *